(12) United States Patent
Moses et al.

(10) Patent No.: US 8,984,311 B2
(45) Date of Patent: Mar. 17, 2015

(54) METHOD, APPARATUS, AND SYSTEM FOR ENERGY EFFICIENCY AND ENERGY CONSERVATION INCLUDING DYNAMIC C0-STATE CACHE RESIZING

(75) Inventors: Jaideep Moses, Portland, OR (US); Rameshkumar G. Illikkal, Portland, OR (US); Ravishankar Iyer, Portland, OR (US); Jared E. Bendt, Hillsboro, OR (US); Sadagopan Srinivasan, Hillsboro, OR (US); Andrew J. Herdrich, Hillsboro, OR (US); Ashish V. Choubal, Austin, TX (US); Avinash N. Ananthakrishnan, Hillsboro, OR (US); Vijay S. R. Degalahal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 13/341,657

(22) Filed: Dec. 30, 2011

(65) Prior Publication Data
US 2012/0173907 A1 Jul. 5, 2012

(51) Int. Cl.
*G06F 1/26* (2006.01)
*G06F 1/32* (2006.01)

(52) U.S. Cl.
CPC ............ *G06F 1/3275* (2013.01); *G06F 1/3225* (2013.01); *G06F 1/3287* (2013.01); *Y02B 60/1225* (2013.01)
USPC ............ 713/320; 713/300; 711/113; 711/118

(58) Field of Classification Search
CPC .............. G06F 1/3275; G06F 11/1064; G06F 12/0866; G06F 12/0871; G06F 12/0888; G06F 12/0897; G06F 2201/885; G06F 2212/601; G06F 2212/2515
USPC .......................... 713/300, 320; 711/113, 118
See application file for complete search history.

(56) References Cited

U.S. PATENT DOCUMENTS

2006/0156048 A1 * 7/2006 Hines et al. .................. 713/320

* cited by examiner

*Primary Examiner* — Michael J Brown
(74) *Attorney, Agent, or Firm* — Blakely, Sokoloff, Taylor & Zafman LLP

(57) ABSTRACT

Embodiments of systems, apparatuses, and methods for energy-efficient operation of a device are described. In some embodiments, a cache performance indicator of a cache is monitored, and a set of one or more cache performance parameters based on the cache performance indicator is determined. The cache is dynamically resized to an optimal cache size based on a comparison of the cache performance parameters to their energy-efficient targets to reduce power consumption.

18 Claims, 12 Drawing Sheets

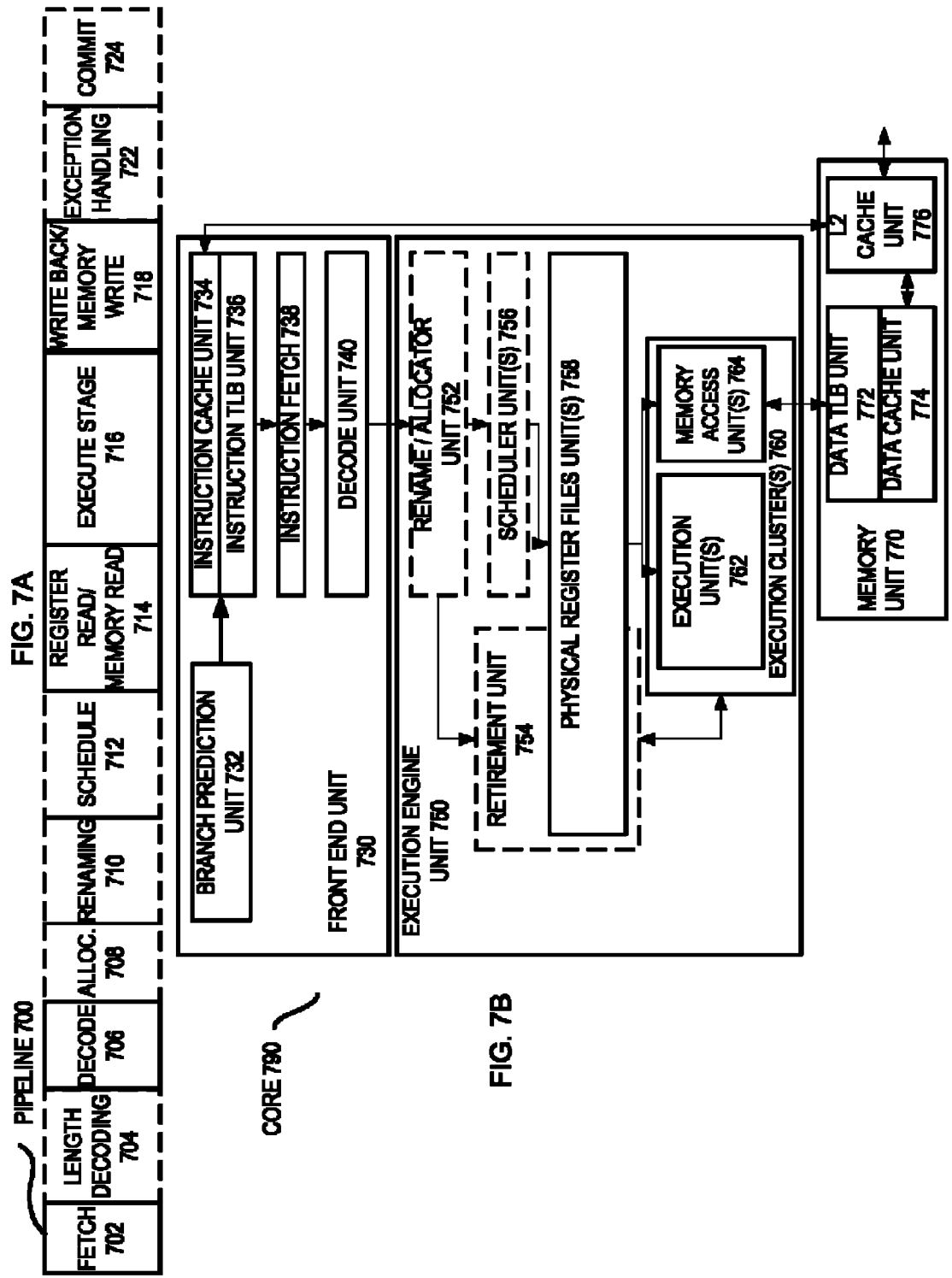

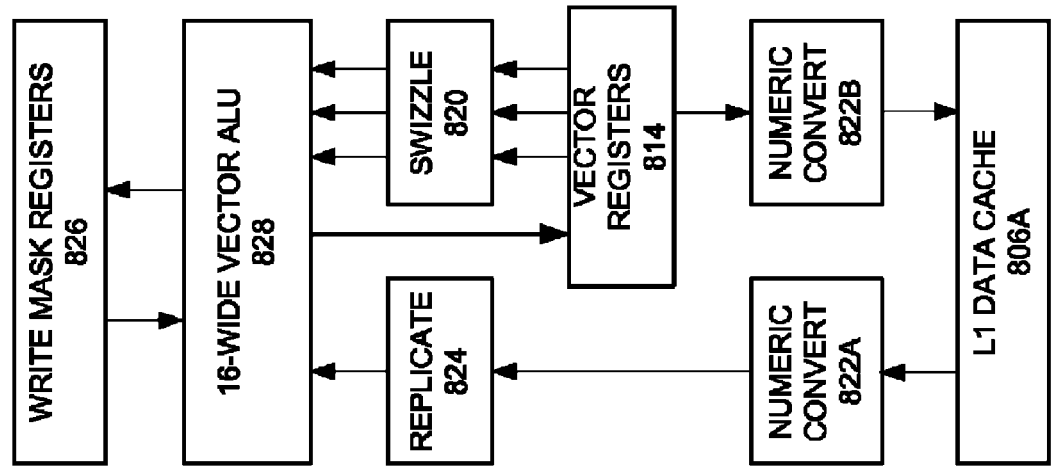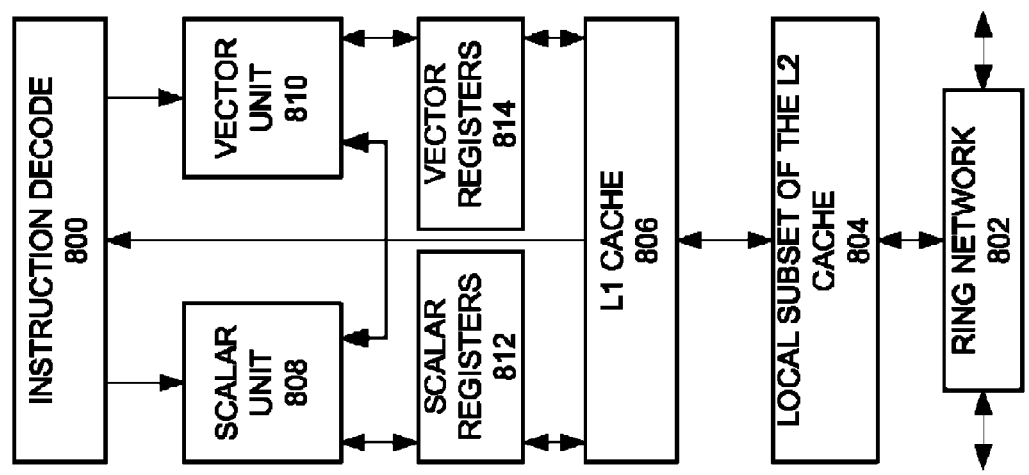

METHOD, APPARATUS, AND SYSTEM FOR ENERGY EFFICIENCY AND ENERGY CONSERVATION INCLUDING DYNAMIC C0-STATE CACHE RESIZING

FIELD OF INVENTION

This disclosure pertains to energy efficiency and energy conservation in integrated circuits, as well as code to execute thereon, and in particular but not exclusively, to dynamic C0-state cache resizing.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

In conventional power management techniques, the power consumption of a multi-core processor can be reduced by monitoring the processor activity of each central processor unit (CPU) core and to power down a CPU core when that particular CPU core is idle. In a multi-core processor architecture, the last level cache (LLC) is shared by all CPU cores. As each CPU core can be independently powered down into a low power state, parts of the LLC can also be powered down to shrink the LLC size to further reduce power consumption. This is because with less CPU cores that are active, less LLC is expected to be needed. Hence, in these power management techniques, the LLC is resized based on the processor activity of the CPU cores in the processor. While this approach reduces the power consumption when one or more CPU cores are idle in a low power state, this approach only shrinks the LLC when the processor is in a low activity state (e.g., when one or more CPU core is idle), and does not provide any power savings when all CPU cores in the processor are active.

BRIEF DESCRIPTION OF THE DRAWINGS

The present invention is illustrated by way of example and not limitation in the figures of the accompanying drawings, in which like references indicate similar elements and in which:

FIG. 7A illustrates a block diagram illustrating both an exemplary in-order pipeline and an exemplary register renaming, out-of-order issue/execution pipeline according to embodiments of the invention.

FIG. 7B illustrates a block diagram illustrating both an exemplary embodiment of an in-order architecture core and an exemplary register renaming, out-of-order issue/execution architecture core to be included in a processor according to embodiments of the invention FIG. 8A illustrates a block diagram of a single processor core, along with its connection to the on-die interconnect network and with its local subset of the Level 2 (L2) cache, according to embodiments of the invention.

FIG. 8B illustrates an expanded view of part of the processor core, according to embodiments of the invention.

DETAILED DESCRIPTION

Figure 1:
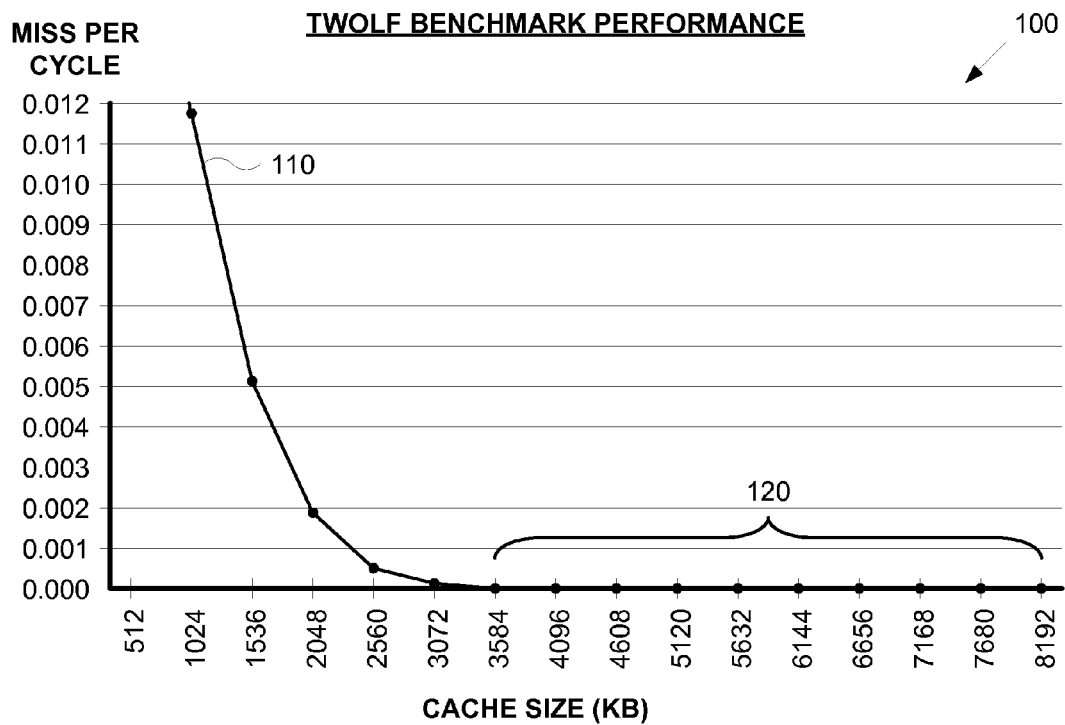
FIG. 1 illustrates a benchmark performance chart.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Power management techniques for computer systems and processors typically use power states. These power states are referred to as C-states (e.g., C0-C7 states). Although different implementations may use a different C-number to refer to a particular power state, a lower C-number represents a higher power state, and a higher C-number represents a lower power state. Thus, the C0 state is highest power state, which is the normal active operating state.

In a multi-core processor, each individual central processing unit (CPU) core has its own C-state, and each CPU core can be put into its own power state independent of the other CPU cores. The processor as a whole also has a C-state, and the processor enters a particular C-state when all the CPU cores in processor are put into that particular C-state. To distinguish between a CPU core power state and a processor power state, the term "core C-state" and its derivatives are used to refer to the power state of an individual CPU core, and the term "package C-state" and its derivatives are used to refer to the power state of the processor as a whole.

Embodiments of the present invention disclose a Dynamic C0 cache re-Sizing (DC0S) power management technique that resizes a cache, for example, a shared cache such as a last level cache (LLC), while all CPU cores are still in core C0 state. Instead of resizing a cache based on processor activity or idle time of a CPU core, DC0S resizes a cache based on the monitoring of a cache performance indicator of the cache. Hence, with DC0S, the cache is dynamically resized to operate at an optimal cache size while the processor is in a high activity state. By resizing the cache to an optimal cache size, the unused portions of the cache can be powered down to provide power savings even when all CPU cores are active in core C0 state.

In DC0S, to determine the optimal cache size of the cache, a cache performance indicator is used instead of a processor performance indicator such as processor activity or idle time. A cache performance indicator is used in DC0S because how a cache is utilized depends more on the types of workload that is being stored in the cache than on the processor activity. For example, the processor activity of streaming a high definition video can be similar to the processor activity of electronic gaming, because both types of applications require rendering a video on the screen. However, the cache performance of a cache storing these two different types of workloads can be very different. This is because the cache utilization of streaming a high definition video is predictable, but the cache utilization of electronic gaming can be unpredictable due to the interactive nature of electronic gaming where the cache utilization can be heavily dependent on user input. Hence, instead of using a processor performance indicator such as processor activity or idle time as a metric to resize the cache, embodiments of the present invention uses a cache performance indicator to provide a better correlation between the optimal cache size of the cache and the workload that is being stored in the cache.

A cache, for example, a shared cache such as a LLC, can be dynamically resized to a significantly smaller cache size from the full cache size during run-time with little impact on application performance. As the cache size is reduced, the number of cache misses per cycle increases. The impact of the increase in MPC on application performance can be determined by measuring the instructions per cycle (IPC) throughput. Although the impact of shrinking the cache depends on the type of application and workload being executed, the profiling of a spectrum of different workloads with a variety of cache miss and instruction throughput rates show that for most applications, shrinking the cache down from the full cache size to yield an increase of 0.0001 cache miss per cycle (i.e. one cache miss every 10,000 clock cycles) resulted in only about a 1% impact on the IPC throughput. The same is true when multiple applications are running on multiple CPU cores. Hence, by sacrificing only about a 1% loss in application performance, a significant portion of the cache can be powered down to reduce power consumption. The cache size can be reduced until a 0.0001 increase in cache miss per cycle is achieved. Although the cache size can be reduced further to lower the power consumption even more, reducing the cache size further beyond the point in which a 0.0001 increase in cache miss per cycle results may start to dramatically degrade application performance. Hence, the metric of a 0.0001 increase in cache miss per cycle strikes a good balance between the loss in performance and the reduction in power consumption.

To illustrate how a cache performance indicator, such as the number of cache misses counted by a cache miss counter, can be used as a metric to resize a cache, FIG. 1 illustrates a "twolf" benchmark performance chart 100 showing the impact on cache miss per cycle when shrinking a cache from 8192 KiloBytes (KB) down to 1024 KB in decrements of 512 KB when executing the "twolf" benchmark test. This can represent, for example, a cache that has 16 cache ways of 512 KB each, with one cache way being powered down in each decrement step. The curve 110 is obtained by measuring the cache miss per cycle at the various cache sizes with only the "twolf" benchmark test running. No other workloads are running during the measurements. At the full cache size of 8192 KB, the cache miss per cycle was measured to be 0.0000005, which means that there is almost no cache misses going out of the cache as the workload of the "twolf" benchmark test entirely fits in the 8192 KB of cache. As mentioned above, most applications can tolerate a 1% impact on application performance by shrinking the cache size to yield an increase of 0.0001 cache miss per cycle. Applying this to the "twolf" benchmark test, increasing the 0.0000005 cache miss per cycle at full cache size by 0.0001 yields a target cache miss per cycle of 0.0001005.

The smallest cache size that achieves this target cache miss per cycle of 0.0001005 when running the "twolf" benchmark test reflects the ideal cache size that the cache should be operated at. That ideal cache size is the operating point where the most amount of cache can be powered down without degrading the application performance beyond about 1%. Referring to the curve 110 in FIG. 1, at a cache size of 3584 KB, the "twolf" benchmark test still yields a cache miss per cycle of about 0.0000005, but at a cache size of 3072 KB, the "twolf" benchmark test yields a cache miss per cycle of about 0.00019. Hence, the smallest cache size to achieve the target MPC of 0.0001005 without going above that target cache miss per cycle would be 3584 KB. This means that the cache size can be reduced from 8192 KB down to 3584 KB in the region 120 of the curve 110 at the cost of only about a 1% loss in IPC or application performance. In other words, with the workload of the "twolf" benchmark test, over half of the cache can be powered down without sacrificing more than about 1% in application performance. As this example illustrates, a cache performance indicator, such as the number of cache misses counted by a cache miss counter, can be monitored, and the cache size can be adjusted until the cache performance comes close to a target cache performance level to arrive at an optimal cache size.

Figure 2:
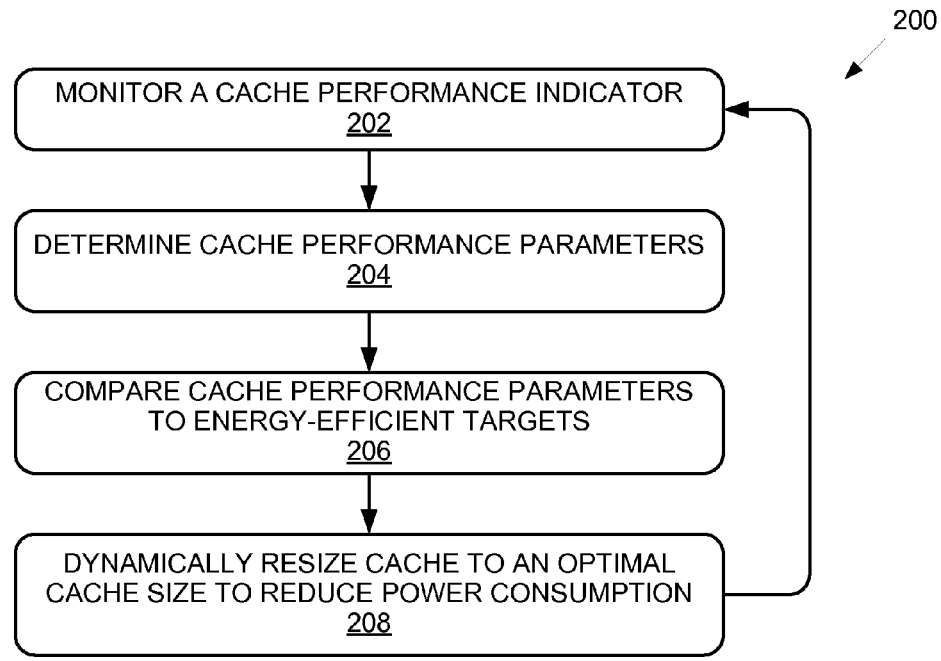
FIG. 2 illustrates a method of reducing power consumption in a processor, according to one embodiment of the invention.

Based on the principles described above, the DC0S power management technique disclosed herein uses a cache performance indicator of the cache to determine how much the cache should be shrunk or expanded to arrive at an optimal cache size that reduces power consumption with a minimal impact on performance. FIG. 2 illustrates a heuristic method 200 for reducing power consumption by dynamically resizing a cache, for example, a shared cache such as a LLC, according to the DC0S power management technique used in embodiments of the present invention. At block 202, a cache performance indicator of the cache is monitored. In one embodiment, the cache performance indicator is a cache miss counter that counts the number of cache misses. The cache miss counter may be part of a set of cache performance counters that are readily available in a processor. The cache performance indicator can be monitored in intervals of 1 second, for example, to count the number of cache misses per second that occurred in the cache. In other embodiments, other interval lengths can be used. Initially, the cache performance indicator is monitored when the cache is operating at the full cache size. Monitoring the cache performance indicator, for example, a cache miss counter, when the cache is operating at the full cache size allows DC0S to have a baseline on how the cache is performing with the current workload, and as will be described below, allows DC0S to use this information to determine an energy-efficient cache performance target for the cache.

At block 204, a set of one or more cache performance parameters based on the cache performance indicator is determined. In one embodiment, the set of one or more cache performance parameters includes at least one of a cache miss per cycle measurement (MPC), a target cache miss per cycle deviation, and a cache miss per cycle variation. The MPC can be determined by dividing the number of cache misses as indicated in the cache miss counter in a 1 second interval by the clock frequency. Having determined the MPC while the cache is operating at the full cache size, a target cache miss per cycle (TMPC) can be determined. The TMPC is determined with the following equation:

TMPC=MPC at full cache size+target offset value (TOV).

The TOV is the increase in cache miss per cycle that can be tolerated when reducing the cache size. As discussed previously, most applications can tolerate a 0.0001 increase in cache miss per cycle, because a 0.0001 increase in cache miss per cycle translates to about a 1% loss in application performance. Accordingly, in one embodiment, the TOV is set at 0.0001. It should be understood that in other embodiments, a different TOV value can be used to tailor the DC0S power management technique to other applications or other types of workload scenarios.

Once the TMPC has been determined, a target cache miss per cycle deviation can be determined. The TMPC deviation is the difference between the TPMC and the current measurement of the MPC, or:

TMPC deviation=TMPC−current MPC.

If the TMPC deviation is positive, this means that the cache can be shrunk without heavily impacting application performance. If the TMPC deviation is negative, this means the cache should be expanded to reduce the increase in cache misses to prevent the application performance from being severely degraded.

A cache miss per cycle variation is determined by the difference between the MPC of one monitoring interval and the MPC of the next monitoring interval when the cache size of the cache is constant, or:

MPC variation=$\text{MPC}_{(time=1)}-\text{MPC}_{(time=0)}$, when cache size is constant.

For example, if the monitoring interval is 1 second, then the MPC variation would be the difference between the MPC measured during a one second interval and the MPC measured during the next one second interval. The cache size has to be constant during the two seconds. In other words, the cache size should have reached a stable size before the MPC variation can be determined. The MPC variation is used to detect a workload phase change. A workload phase change occurs when applications are started or stopped resulting in a significant change in the workload that is stored in the cache. If the MPC variation is determined while the cache size is changing, false workload phase changes may be detected because variations in the MPC during this cache size transitional time may be caused by the resizing of the cache rather than actual workload changes.

Referring back to FIG. 2, at block 206, the set of one or more cache performance parameters determined in block 204 is compared with a set of one or more energy-efficient targets for those cache performance parameters. In block 206, the cache is dynamically resized to an optimal cache size based on the comparison of the cache performance parameters to their energy-efficient targets to reduce power consumption. The set of one or more energy-efficient targets indicate the cache performance levels that the cache should operate at in order to achieve an optimal balance between power savings and loss in performance. For the cache to reach those energy-efficient targets, the cache is heuristically resized until the cache is at an optimal cache size that yields cache performance levels close to those energy-efficient targets. While the cache size can always be reduced further to lower dynamic power consumption, operating the cache at a further reduced cache size may not necessary be the most energy-efficient. This is because the application performance may be degraded to an extent such that the execution of a task may take much longer to complete due to significantly more cache misses and more main memory accesses. This may result in a net energy usage that ends up being greater than the net energy usage if the cache was operated at the optimal cache size.

In one embodiment, the set of one or more energy-efficient targets include the TMPC, a convergence threshold, and a stability threshold. The TMPC determines the optimal cache size that the cache should be resized to in order to operate the cache in an energy-efficient manner. The TMPC is compared with the current MPC. If the current MPC is less than the TMPC, then the cache is shrunk. If the current MPC is greater than the TMPC, then the cache is expanded. In an exemplary embodiment, the cache is organized into cache ways, and the cache is resized by enabling or disabling each cache way. In other words, the cache is expanded by enabling one or more cache ways of the cache, and the cache is shrunk by disabling one or more cache way of the cache. The magnitude (how many cache ways to enable or disable at a time) of the resize operations depends on how much of the cache is already enabled. In one embodiment, if more than half of the cache is enabled, then during a cache shrink, two cache ways are disabled at a time. Conversely, if less than half the cache is enabled, then during a cache expansion, two cache ways are enabled at a time. Otherwise, the resize operations enable or disable one cache way at a time.

The convergence threshold (CT) can be used to achieve convergence if the cache is consistently oscillating between expansion and shrinkage. This can happen if the exact TMPC cannot be achieved because of the granularity of memory locations being enabled or disabled during the resize operation. For example, suppose the cache is resized in a granularity of cache ways as described above. If the cache size of eight cache ways yield a current MPC that is just below the TMPC, but the cache size of seven cache ways yield a current MPC that is just above the MPC, that eighth cache way may be constantly being enabled and disabled as the cache is constantly being resized in attempts to achieve the TMPC. In this example, a CT can be used to prevent the DC0S power management technique from constantly enabling and disabling that eighth cache way.

The CT is compared with TMPC deviation. If the magnitude or absolute value of the TMPC deviation is less than the CT, then the cache is left to remain at the same size. In other words, the cache is dynamically resized until the magnitude of the TMPC deviation is less than the CT. Thus, in a sense, the CT expands the TMPC into a range to allow the current MPC to converge with the TMPC as the cache is resized. In the above example, if the CT is set large enough such that the CT is greater than the TMPC deviation when the cache size is at eight cache ways, then once the cache has been shrunk to eight cache ways, the resizing operation would stop, as the current MPC would be considered to have converged with the TMPC. Using a CT also reduces power consumption in that the power consumption associated with the constant resizing of the cache can be eliminated once the magnitude of the TMPC deviation becomes less than the CT. In an exemplary embodiment, the CT is set to 0.00001. In other embodiments, other CT values can be used.

The stability threshold (ST) represents the sensitivity in detecting workload phase changes. The ST is compared with the MPC variation. A workload phase change is detected if the magnitude or absolute value of the MPC variation is above the ST. When a workload phase change is detected, the cache is reverted to the full cache size to allow a new TMPC to be determined based on the new workload. A smaller ST increases the sensitivity in detecting workload phase changes. In one exemplary embodiment, the ST is set to 0.0005. In other embodiments, other CT values can be used. While smaller values of ST may increase the likelihood that all workload phase changes are detected, it may adversely affect the average amount of cache shrinkage and power savings, because the cache would end up reverting to a full cache size every time the magnitude of MPC variation is above ST.

In summary, the DC0S power management technique according to embodiments of the present invention dynamically resizes a cache according to the following conditions:

shrink cache size when: current MPC>TMPC;

expand cache size when: current MPC<TMPC;

maintain cache size when: absolute value (TMPC deviation)<CT;

revert to full cache size when: absolute value (MPC variation)>ST.

Because the workload or other operating conditions may change over time, the cache performance indicator (e.g., the cache miss counter) is continually monitored and the cache performance parameters are continually determined and compared with the energy-efficient targets to dynamically resize the cache as needed. It should be noted that not all embodiments require using all of these conditions. For example, an alternative embodiment may not use a CT or a ST, and the cache is dynamically resized solely based on a comparison of the current MPC to the TMPC. It should also be noted that in other embodiments, different values of TOV, CT, and ST may be used. Some embodiments can also include a set of selectable values for each of TOV, CT, and ST. Different values for TOV, CT, and ST can be selected depending on the particular types of applications running or the operating conditions of the processor, and the DC0S power management technique can be configured to use those selected values.

Furthermore, other conditions in addition to those described above can also be used to determine how the cache is dynamically resized. For example, when the cache is shrunk, it is expected that the MPC would increase. If the MPC decreases during cache shrinkage, this may indicate that a workload phase change has occurred during shrinking of the cache. Similarly, when the cache is expanded, it is expected that the MPC would decrease. If the MPC increases during cache expansion, this may indicate that a workload phase change has occurred during expansion of the cache. In both cases, if the unexpected change in MPC is above a resizing threshold (RT), then the cache may be reverted to full cache size to determine a new TMPC because a workload phase change has been detected.

In other embodiments, other cache performance indicators, such as a cache hit counter, can be used. For example, in an alternative embodiment, the impact on application performance of reducing the number cache hits per cycle for various workloads can be determined. The same heuristic methodology as those described above can be used to determine an optimal energy-efficient target cache hit per cycle for a variety of workloads, and the cache size be dynamically resized to achieve that energy-efficient target cache hit per cycle.

Figure 3:
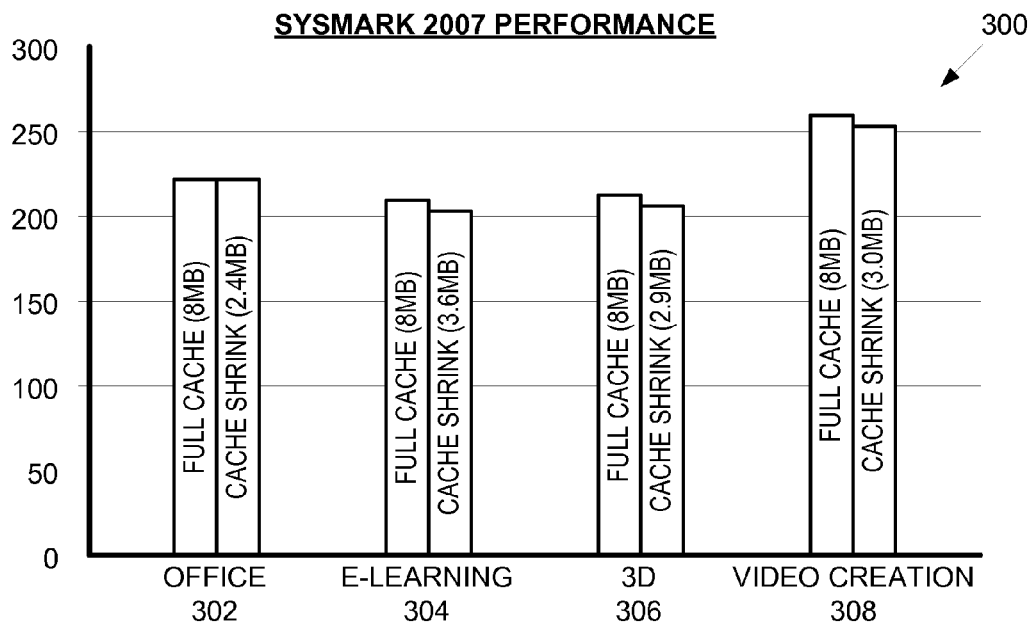
FIG. 3 illustrates an application performance chart, according to one embodiment of the invention.

To demonstrate the effectiveness of the DC0S power management technique according to embodiments of the present invention, FIG. 3 illustrates a Sysmark 2007 performance chart 300 that shows the impact of using the DC0S power management technique when running real world scenarios as used in the Sysmark 2007 benchmark test. These real world scenarios are presented on the x-axis. The real world scenarios are office productivity 302, e-learning 304, 3D rendering 306, and video creation 308. Each of these four real world scenarios run different applications that present multiple types of workloads, work load phase changes, idle times, and response times. The Sysmark score for each of these real world scenarios are presented on the y-axis. Each real world scenario includes a Sysmark score when running with a full cache size of 8 MB, and a Sysmark score when running with a resized cache using DC0S.

The Sysmark 2007 performance chart 300 shows that for all of these four real world scenarios, the performance loss with DC0S is minimal (as shown by the scores on the y-axis). DC0S was able to shrink the cache from 8 MegaBytes (MB) down to 2.4 MB for office productivity, 2.6 MB for e-learning, 2.9 MB for 3D rendering, and 3 MB for video creation. On average, DC0S achieved a 63% shrink (from 8 MB down to 3 MB) with only 1.12% loss in performance for Sysmark2007 benchmark test. This is a significant reduction in cache size for a miniscule ~1% loss in performance and provides power savings opportunities even when the processor is in a high active state by powering down portions of the cache to operate the cache at an optimal cache size.

In another aspect of the present invention, the DC0S power management technique also allows a processor to have a faster entry into an enhanced deep-sleep state to increase both the number of opportunities the processor can enter the enhanced deep-sleep state and the amount of time the processor spends in the enhanced deep-sleep state. An enhanced deep-sleep state is a power state where the supply voltage of a component or device is removed or lowered to 0 Volts (V). In an exemplary embodiment, the processor enhanced deep-sleep state is referred to as a package C7 state, and an enhanced deep-sleep state for a CPU core is referred to as a core C7 state. It should be understood that in other embodiments, the enhanced deep sleep state may be referred to with a different C-number.

In a core C7 state, the supply voltages to the CPU core are lowered to 0 Volts (V). In order for a processor to enter package C7 state, all CPU cores in the processor must be in core C7 state. In addition, to further reduce power consumption, the package C7 state also requires that a cache shared by the CPU cores, such as a LLC, is powered down. Hence, when all CPU cores in a processor are put into core C7 state, the processor as a whole can enter an enhanced deep sleep package C7 state by flushing the cache shared by the CPU cores and lowering a supply voltage to the cache to 0 V.

However, the overhead and latencies associated with powering down an entire cache can be significant. Every time the cache is powered down, the cache has to be flushed, and any modified data stored in the cache has to be copied into main memory. When a CPU core exits core C7 state to go back into core C0 state, the cache is expanded to accommodate the CPU core that is becoming active, and data from main memory has to be reloaded or copied back into the cache. Due to these significant overhead and latencies, conventional power management techniques do not flush and power down the entire cache in one step when a processor is to enter package C7 state, because it can be unpredictable how long a processor may reside in package C7 state.

For example, if the processor activity occurs in bursts with little idling time in between the bursts, the CPU cores in the processor may enter and exit core C7 state at a rate that is faster than the time that it takes to flush and reload the entire cache. If the entire cache is flushed in one step every time the CPU cores enter core C7 state to put the processor into package C7 state, the processor may have to be stalled until the cache operations are complete before the CPU cores can wake up and restart activity. Thus, flushing and powering down an entire cache in one step may degrade the processor performance if the latencies involved with flushing and reloading the cache exceeds the idling time in between the processor activity bursts. For this reason, in conventional power management techniques, the cache is flushed and powered down gradually in a multi-step process.

In conventional power management techniques, the amount of cache that is flushed and powered down depends on how long the CPU cores have been residing in core C7 state. The longer that the CPU cores stay in core C7 state, the greater the amount of cache that is flushed and powered down. If the CPU cores remain in core C7 state for only a short period of time, the cache may remain powered and not be flushed at all such that the CPU cores can wake up and re-enter core C0 state quickly without incurring any overhead associated with powering down the cache. As the CPU cores remain in core C7 state longer, the cache is flushed and powered down in multiple steps to limit the impact of the cache operations. When all CPU cores remain in core C7 state for a long enough time, the entire cache becomes flushed and can be powered down to put the processor into package C7 state.

While this step-wise approach to powering down an entire cache may lessen the impact of the overhead and latencies involved with powering down the cache, this step-wise approach also limits the amount of time a processor reside in package C7 state when the entire cache is powered down because it takes longer to enter package C7 state. A longer time to enter package C7 state also limits the number of opportunities for the processor to enter package C7 state because the processor can only enter package C7 state if the CPU cores are idle for a long enough time to allow the processor to reach package C7 state.

Unlike the multi-step approach described above, the DC0S power management technique according to embodiments of the present invention also allows a processor to enter package C7 state more quickly by flushing a cache, for example, a shared cache such as a LLC, in one step when all CPU cores in a processor enter core C7 state. With DC0S, the cache can be flushed in one step because the cache is already operating at an optimal cache size before the CPU cores enter core C7 state. While it is possible that with certain workloads, the optimal cache size may be the full cache size, it is expected that in most cases, the optimal cache size is a cache size that is smaller than the entire cache. As such, with DC0S, less latency is expected to be needed when powering down the cache to put the processor into package C7 state because a portion of the cache is expected to have been flushed and powered down already while the CPU cores were still in core C0 state.

Furthermore, with DC0S, when the CPU cores exit core C7 state, the cache can be quickly expanded and powered back on. When a processor exits package C7 state, it is expected that the processor would execute the same type of workload that the processor was executing just prior to entering package C7 state. Hence, by determining an optimal cache size using DC0S prior to the processor's entrance into package C7 state, it is not necessary to expand the cache back to the full cache size when exiting package C7 state. Instead, the cache is expanded to that optimal cache size instead of being gradually expanded to the full cache size.

Figure 4:
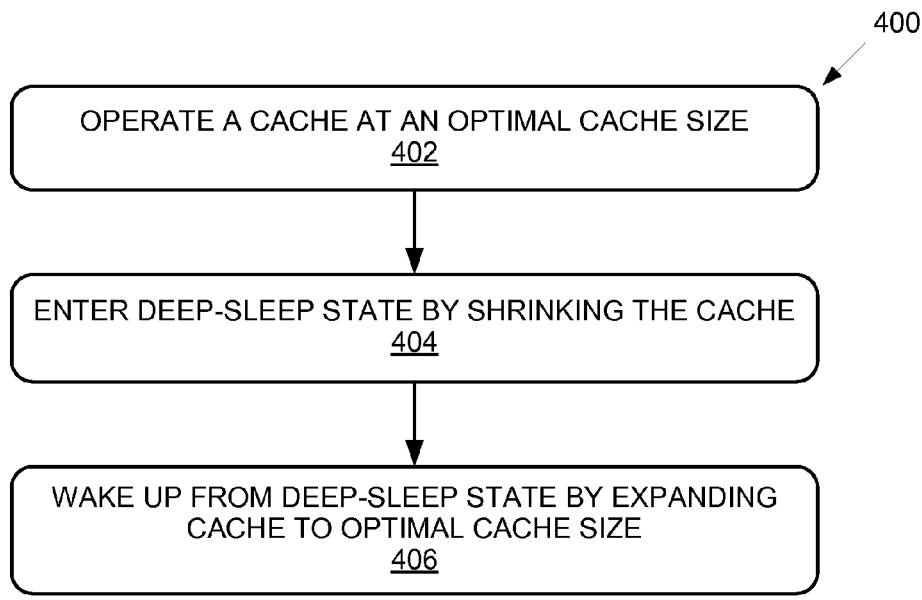
FIG. 4 illustrates another method of reducing power consumption in a processor, according to one embodiment of the invention.

FIG. 4 illustrates a method 400 for reducing power consumption by increasing the amount of time a processor spends in an enhanced deep sleep state and by increasing the number of opportunities for the processor to enter the enhanced deep sleep state. At block 402, a processor's cache, for example, a shared cache such as a LLC, is operated at an optimal cache size. The cache is operated at the optimal cache size using the DC0S power management technique described above with reference to FIG. 2. At block 404, the processor enters an enhanced deep-sleep state by shrinking the entire cache. The entire cache is shrunk by flushing cache and powering down the cache. In one embodiment, the enhanced deep-sleep state is a package C7 state where all CPU cores in the processor are powered down, and the entire cache is flushed and powered down. The cache can be flushed in a single step process because part of the cache is expected to have already been flushed and powered down when the cache was resized to operate at the optimal cache size.

At block 406, the process wakes up from the deep-sleep state by expanding the cache to a size that was determined to be the optimal cache size prior to entering the deep-sleep state. By operating the cache at an optimal cache size before entering the enhanced deep-sleep state and reverting back to the optimal cache size after waking up from the deep-sleep state, the latencies associated with flushing and reloading the cache is reduced from the latencies that would be incurred if the entire full cache size is flushed and reloaded. As a result, the amount of time a processor spends in an enhanced deep-sleep state and the number of opportunities for the processor to enter the enhanced deep-sleep state are increased to reduce the overall power consumption of the processor.

Figure 5:
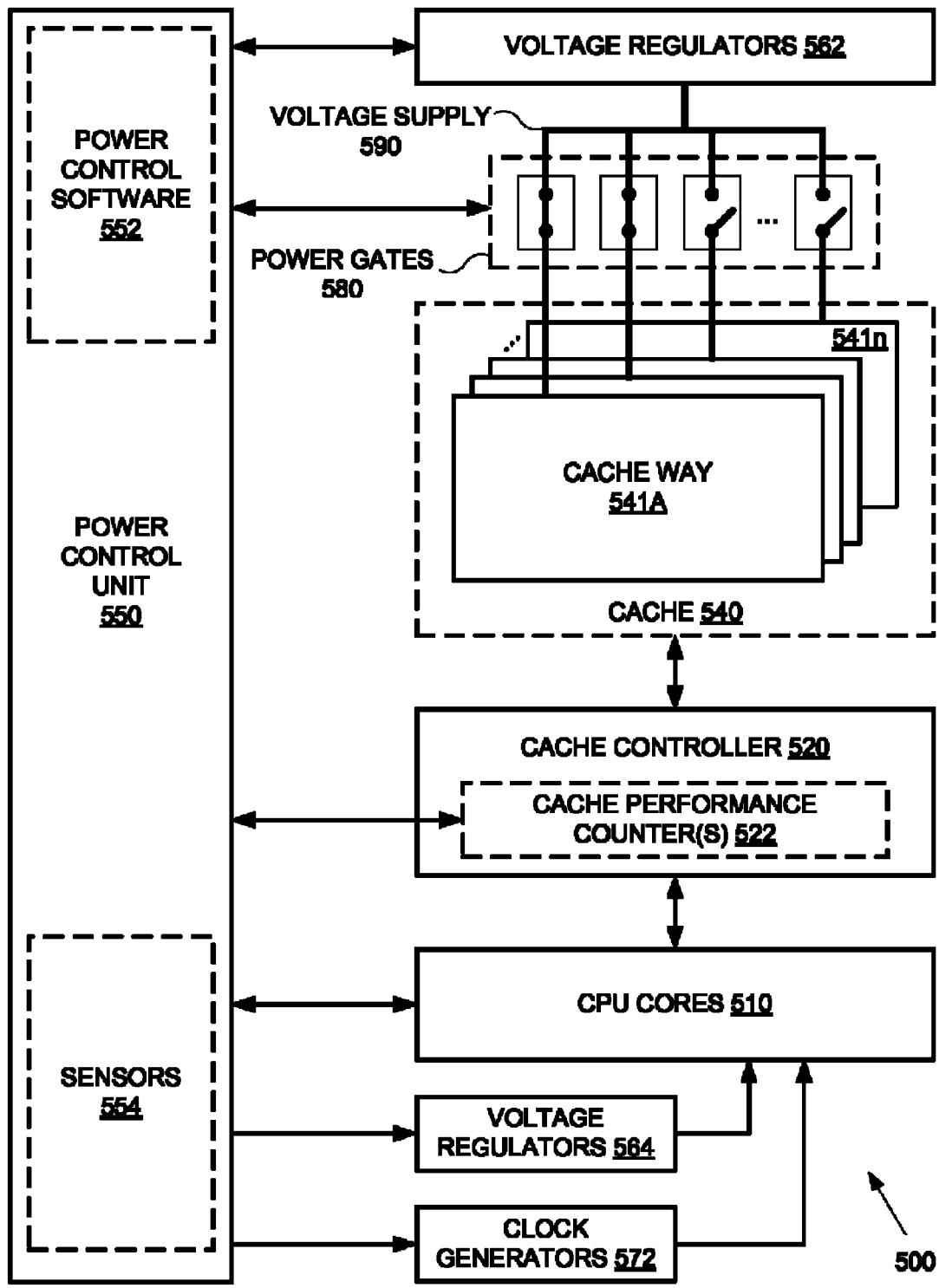
FIG. 5 illustrates a functional block diagram of a system, according to one embodiment of the invention.

FIG. 5 illustrates a block diagram of a system 500 in accordance with embodiments of the invention. In one embodiment, system 500 is a system-on-chip (SoC) processor. The system 500 includes one or more central processing unit (CPU) cores 510. Each CPU core 510 also has its own core cache (not shown), for example, a level 1 (L1) cache, which is not shared by the other CPU cores. The system also includes a cache 540 that is coupled to the CPU cores 510. The cache 540 is a shared cache that is shared among the CPU cores 510, and can be accessed by any of the CPU cores 510. A cache controller 520 controls cache accesses from the CPU cores 510 to the cache 540. In one embodiment, the cache controller 520 also includes cache performance counters 522 to collect cache performance statistics such as cache hits and cache misses associated with cache accesses from the CPU cores 510 to the cache 540. The cache performance counters 522 may include a cache hit counter and a cache miss counter.

The cache 540 is can be a last level cache (LLC), or a shared mid-level cache such as a shared level 2 (L2), level 3 (L3), level 4 (L4), or other levels of shared data cache and/or combinations thereof. The cache 540 is organized into a plurality of cache partitions. For example, each cache partition of cache 540 can be a cache way 541A-541n. Each cache way 541A-541n may include one or more cache sets. In one embodiment, each cache way 541A-541n is coupled to a voltage supply 590 through power gates 580. The power gates 580 allow each cache way 541A-541n to be independently enabled/powered-on or be disabled/powered-down to resize the cache 540. In some embodiments, each memory cell of the cache 540 includes a sleep transistor. When the power gates 580 turn off or power downs a cache way 541A-541n, the sleep transistor of each memory cell in the corresponding cache way 541A-541n is enabled to lower the voltage of the memory cells down to 0 Volts (V).

In some embodiments, the voltage supply 590 to the cache 540 is driven by the output of integrated voltage regulators 562. The voltage regulators 562 is used to filter out external voltage fluctuations and provides a steady voltage level to voltage supply 590 to power the cache 540. The voltage regulators 562 also allow the voltage level of voltage supply 590 to be adjusted. For example, the voltage regulators 562 can be adjusted to lower the voltage level of voltage supply 590 to reduce the power consumption of the cache 540. Similarly, the voltage supply to the CPU cores 510 can be driven by the output of integrated voltage regulators 564 to allow the voltage supply to the CPU cores 510 to be adjusted and lowered to reduce power consumption.

The clocks of the CPU cores can be driven by the output of clock generators 572. Clock generators 572 may include phase lock loops (PLLs) and clock multipliers and dividers. Clock generators 572 allow the clock frequency to each CPU core 510 to be adjusted depending on processor load. For example, to reduce power consumption, the clock frequency of a CPU core 510 can be lowered when the activity and load of that CPU core 510 is low, or the clock to the CPU core 510 can be turned off when the CPU core 510 is idle.

In an embodiment, the system 500 includes a power control unit (PCU) 550 to manage the power consumption of system 500 and to control the power related components of the system 500 such as the voltage regulators 562 and 564, clock generators 572, and power gates 580. The PCU 550 can include sensors 554 to sense and measure the voltage level, electrical current, temperature, or other power related metrics at the different components of the system 500. The PCU 550 can also include a microcontroller and power control software 552 to store software code that can be executed by the microcontroller to perform the power management of the system 500. In one embodiment, the power control software 552 includes power management algorithms including DC0S as described above that are used to manage the power consumption of the system 500. The power control software 552 can be used by the PCU 550 to automatically and dynamically manage the power consumption of the system 500 or to respond to operating system requests, interrupts, or other operating conditions of the system 500 to put the CPU cores 510 into a low power core C-state and/or the system 500 in a low power package C-state, or to take the CPU cores 510 and/or the system 500 out of their respective low power states.

For example, in one embodiment, the PCU 550 can put a CPU core 510 into a core C7 state by configuring the clock generators 572 to turn off the PLL as well as the output clock to that CPU core 510, and configuring the voltage regulators 564 to turn off the supply voltage or to apply 0 Volts to that CPU core 510. In further embodiments, the PCU 550 can put a CPU core 510 into deeper core C-states, for example, core C9/C10 states, by turning off the input voltage to the respective voltage regulators 564 that provides the supply voltage to that CPU core 510.

In accordance to embodiments of the present invention, the PCU 550 is adapted to determine an optimal cache size of the cache 540 based on monitoring a cache performance indicator of the cache 540, and to reduce power consumption by selectively powering one or more cache partitions, such as one or more cache ways 541A-541n, to dynamically resize the cache 540 to achieve the optimal cache size while the CPU cores 510 are in normal core C0 state. In one embodiment, the cache performance indicator is a cache miss counter that is part of the cache performance counters 522, and the PCU 550 dynamically resizes the cache 540 using the DC0S power management technique described above with reference to method 200 of FIG. 2. The DC0S can be part of the software that is stored in the power control software 552 of PCU 550. Alternatively, the DC0S can be stored in the BIOS of the system 500.

In one embodiment, the PCU 550 can resize the cache 540 by enabling or disabling one or more of the cache ways 541A-541n. The cache 540 can be shrunk by setting one or more mask bits that corresponds to one or more cache ways 541A-541n to prevent any new data from being written into the cache ways that are being disabled. Once the mask bit is set, the cache ways that are being disabled can be flushed by copying any modified data in those cache ways into main memory. The PCU 550 can then configure the respective power gates 580 to turn off the power to the cache ways that are being disabled. Alternatively, the PCU 550 can configure the respective voltage regulators 563 to reduce the voltage supplies to the cache ways being disabled to 0 V.

The PCU 550 can expand the cache 540 by configure the respective power gates 580 to turn on the power to the cache ways that are being enabled, or to configure the respective voltage regulators 563 to reapply a nominal voltage to the cache ways being enabled. Any required data from the main memory can then be reloaded into the cache 540. The mask bits that correspond to the cache ways being enabled are reset to allow new data to be written into those cache ways. Once the mask bits are reset, the CPU cores 510 are allowed to access to those cache ways.

In one embodiment, the PCU 550 is further adapted to enable an enhanced deep-sleep state by shrinking the entire cache 540 and turning off power to all the cache partitions, such as the cache ways 541A-541n, and to wake up from the enhanced deep-sleep state by expanding the cache 540 to a size that was determined to be the optimal cache size prior to entering the enhanced deep-sleep state. In one embodiment, the enhanced deep-sleep state is a package C7 state where all CPU cores in the processor are powered down in core C7 state, and the entire cache 540 is flushed and powered down. The entry and exit to package C7 state of system 500 can be performed using the techniques as described above with reference to method 400 of FIG. 4.

Figure 6:
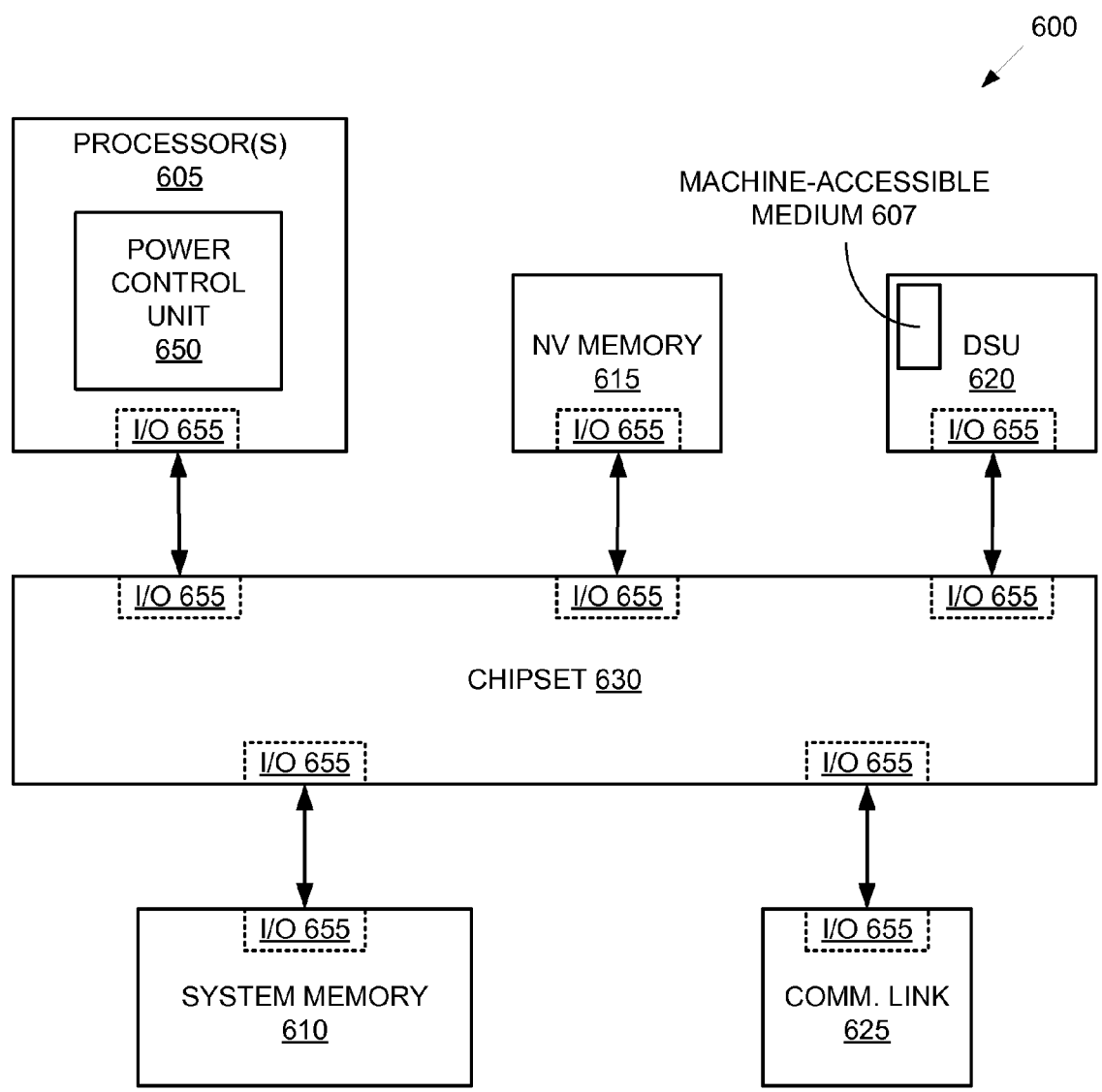
FIG. 6 illustrates a functional block diagram of another system, according to one embodiment of the invention.

FIG. 6 illustrates a functional block diagram illustrating a system 600 implemented in accordance with one embodiment. The illustrated embodiment of processing system 600 includes one or more processors (or central processing units) 605 having power control unit 650 with power control software, system memory 610, nonvolatile ("NV") memory 615, a data storage unit ("DSU") 620, a communication link 625, and a chipset 630. In one embodiment, the power control software may include instruction code to carry out the DC0S power management technique as described above. The illustrated processing system 600 may represent any computing system including a desktop computer, a notebook computer, a workstation, a handheld computer, a server, a blade server, or the like.

The elements of processing system 600 are interconnected as follows. Processor(s) 605 is communicatively coupled to system memory 610, NV memory 615, DSU 620, and communication link 625, via chipset 630 to send and to receive instructions or data thereto/therefrom. In one embodiment, NV memory 615 is a flash memory device. In other embodiments, NV memory 615 includes any one of read only memory ("ROM"), programmable ROM, erasable programmable ROM, electrically erasable programmable ROM, or the like. In one embodiment, system memory 610 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 620 represents any storage device for software data, applications, and/or operating systems, but will most typically be a nonvolatile storage device. DSU 620 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 620 is illustrated as internal to processing system 600, DSU 620 may be externally coupled to processing system 600. Communication link 625 may couple processing system 600 to a network such that processing system 600 may communicate over the network with one or more other computers. Communication link 625 may include a modem, an Ethernet card, a Gigabit Ethernet card, Universal Serial Bus ("USB") port, a wireless network interface card, a fiber optic interface, or the like.

The DSU 620 may include a machine-accessible medium 607 on which is stored one or more sets of instructions (e.g., software) embodying any one or more of the methods or functions described herein. In one embodiment, the machine-accessible medium 607 can be a non-transitory machine readable storage medium and may contain instruction code to carry out the DC0S power management technique as described above. The software may also reside, completely or at least partially, within the processor(s) 605 during execution thereof by the processor(s) 605, the processor(s) 605 also constituting machine-accessible storage media.

While the machine-accessible medium 607 is shown in an exemplary embodiment to be a single medium, the term "machine-accessible medium" should be taken to include a single medium or multiple media (e.g., a centralized or distributed database, and/or associated caches and servers) that store the one or more sets of instructions. The term "machine-accessible medium" shall also be taken to include any medium that is capable of storing, encoding or carrying a set of instructions for execution by the machine and that cause the machine to perform any one or more of the methodologies of embodiments of the present invention. The term "machine-accessible medium" shall accordingly be taken to include, but not be limited to, solid-state memories, optical, and magnetic media.

Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

As illustrated in FIG. 6, each of the subcomponents of processing system 600 includes input/output ("I/O") circuitry 650 for communication with each other. I/O circuitry 650 may include impedance matching circuitry that may be adjusted to achieve a desired input impedance thereby reducing signal reflections and interference between the subcomponents.

It should be appreciated that various other elements of processing system 600 have been excluded from FIG. 6 and this discussion for the purposes of clarity. For example, processing system 600 may further include a graphics card, additional DSUs, other persistent data storage devices, and the like. Chipset 630 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 630. Correspondingly, processing system 600 may operate without one or more of the elements illustrated. For example, processing system 600 need not include DSU 620.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor With Integrated Memory Controller and Graphics

Figure 9:
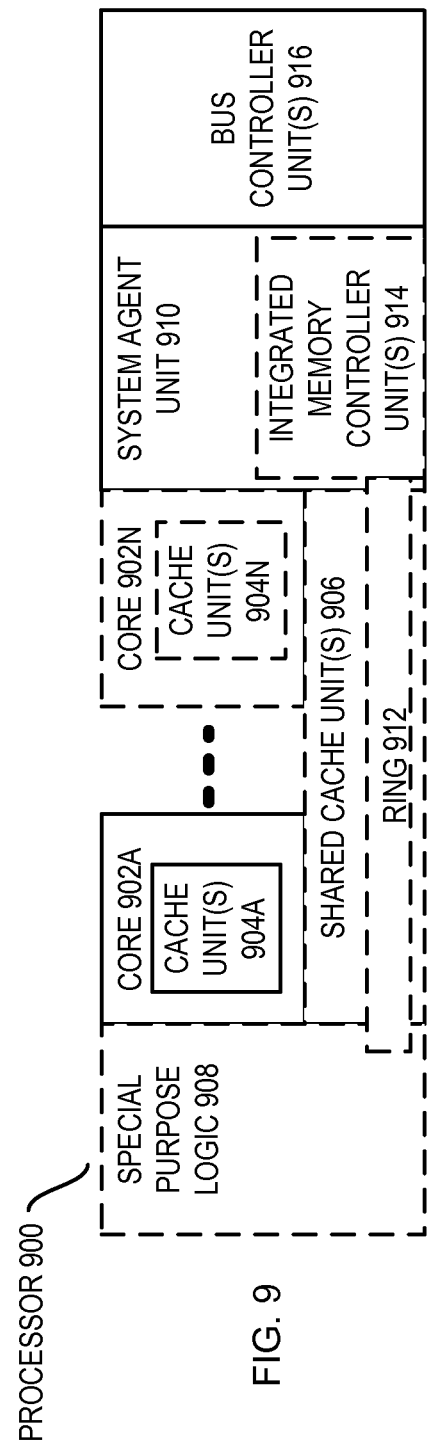
FIG. 9 illustrates a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
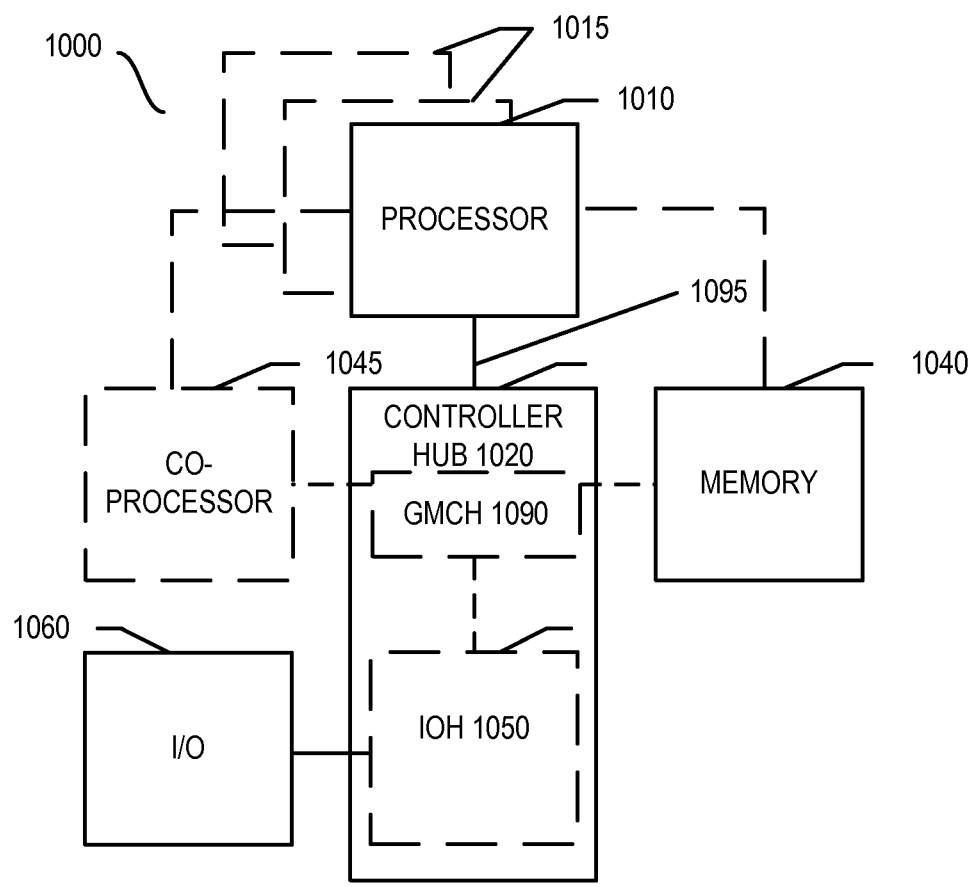
FIG. 10 illustrates a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
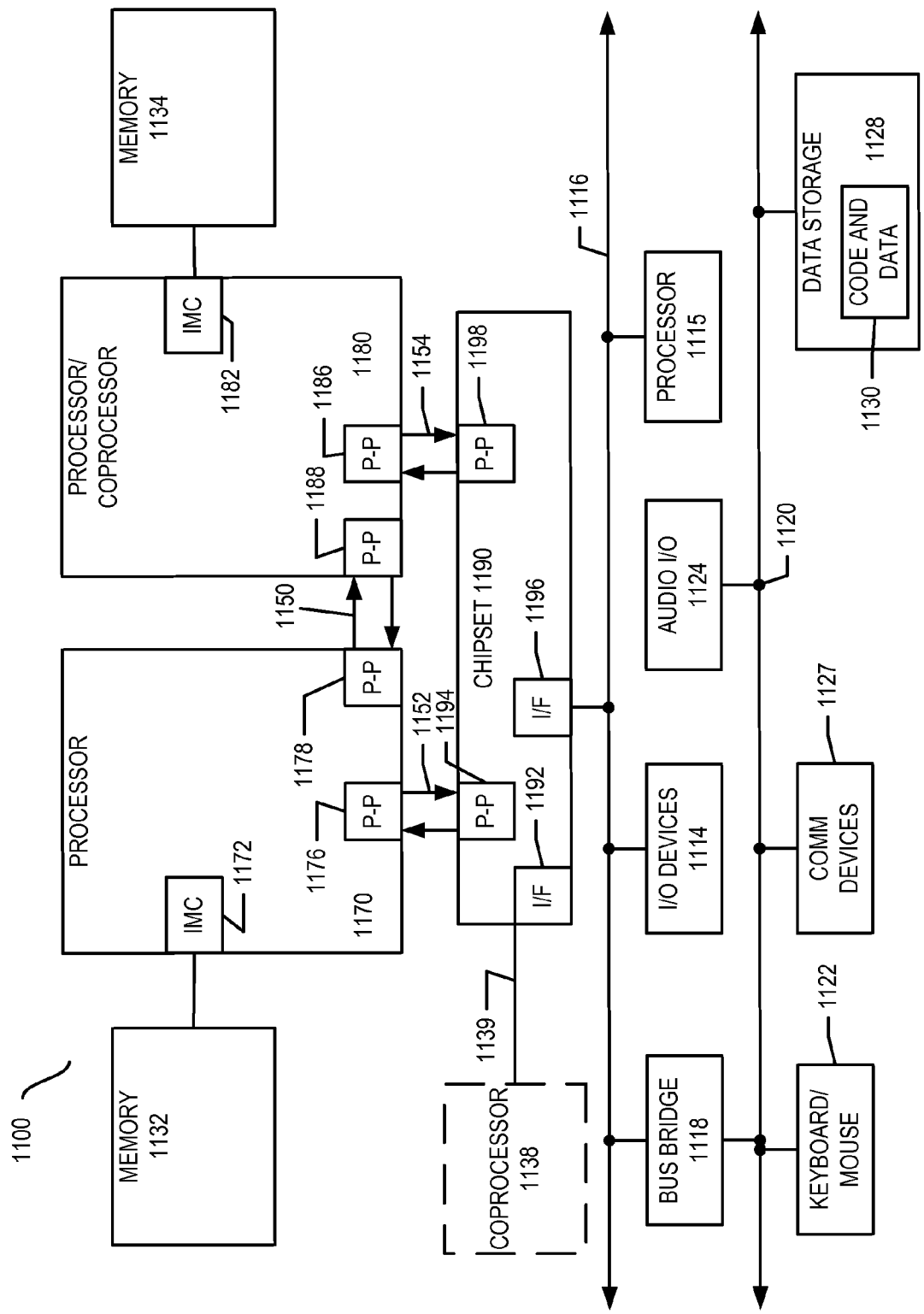
FIG. 11 illustrates a block diagram of a more specific exemplary system in accordance with an embodiment of the present invention

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
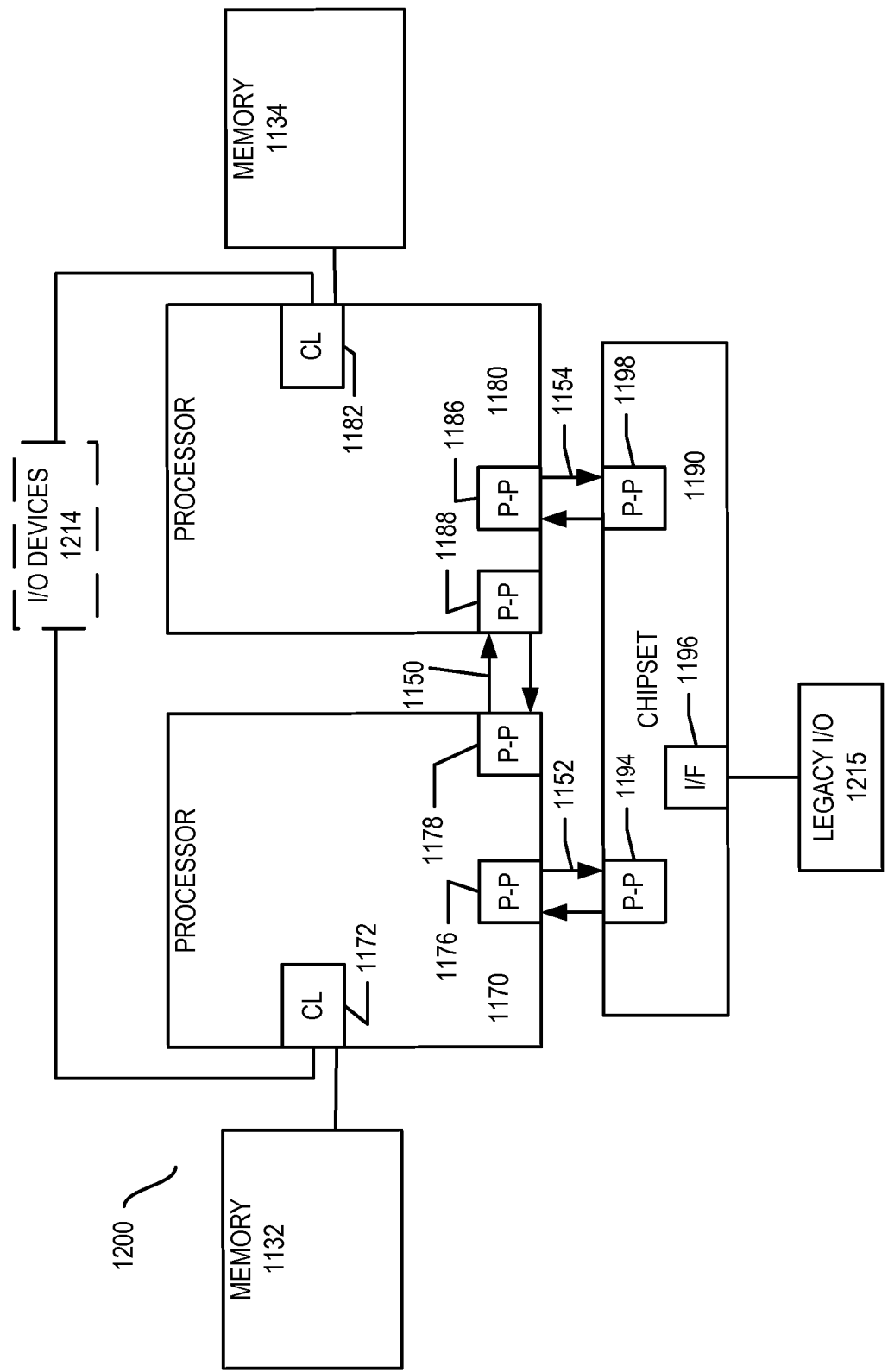
FIG. 12 illustrates a block diagram of another more specific exemplary system in accordance with an embodiment of the present invention

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
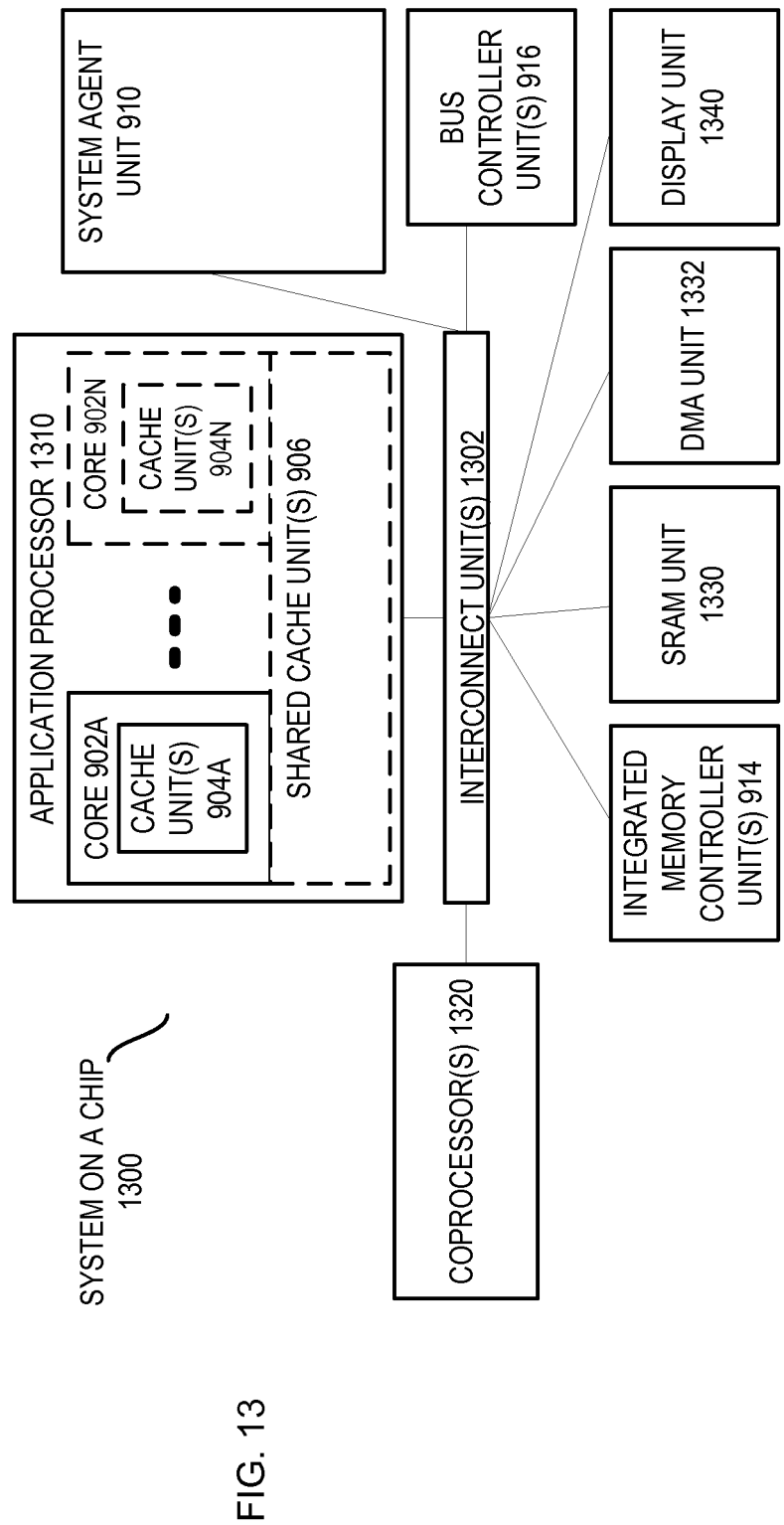
FIG. 13 illustrates a block diagram of a SoC in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
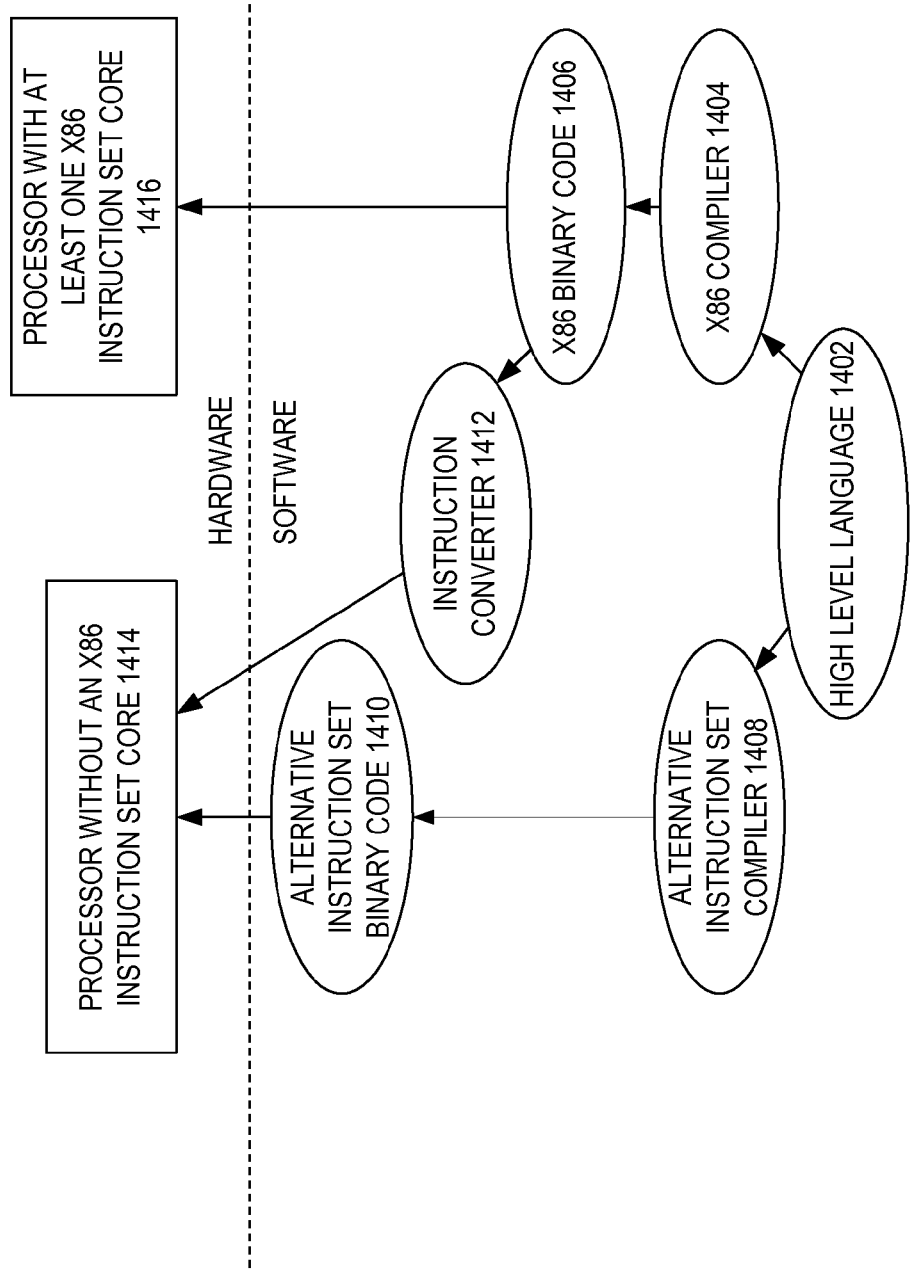
FIG. 14 illustrates a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416.

Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method comprising:
   monitoring a cache performance indicator of a cache;
   determining a set of one or more cache performance parameters based on the cache performance indicator;
   comparing the set of one or more cache performance parameters to a set of one or more energy-efficient targets for those cache performance parameters;
   dynamically resizing the cache to an optimal cache size based on the comparison of the cache performance parameters to the energy-efficient targets to reduce power consumption;
   entering a deep-sleep state by shrinking the cache; and
   waking up from the deep-sleep state by expanding the cache to a size that was determined to be the optimal cache size prior to entering the deep-sleep state.

2. The method of claim 1, wherein the cache performance indicator of the cache is a cache miss counter, and the set of one or more cache performance parameters includes at least one of a cache miss per cycle measurement, a target cache miss per cycle deviation, and a cache miss per cycle variation.

3. The method of claim 2, wherein the set of one or more energy-efficient targets includes a target cache miss per cycle; and
   dynamically resizing the cache includes resizing the cache to tune the cache miss per cycle measurement toward the target cache miss per cycle.

4. The method of claim 2, wherein the set of one or more energy-efficient targets includes a convergence threshold; and
   dynamically resizing the cache includes resizing the cache until the target cache miss per cycle deviation is less than the convergence threshold.

5. The method of claim 2, wherein the set of one or more energy-efficient targets includes a stability threshold; and
   dynamically resizing the cache includes reverting the cache to a full cache size when a workload phase change is detected, wherein the workload phase change is detected when the cache miss per cycle variation is above the stability threshold.

6. The method of claim 1, wherein the cache is expanded by enabling one or more cache ways of the cache, and the cache is shrunk by disabling one or more cache ways of the cache.

7. The method of claim 1, wherein the cache is a last level cache (LLC).

8. A non-transitory, machine readable storage medium containing instructions that when processed by a machine causes the machine to fabricate logic capable of performing a method, the method comprising:
   monitoring a cache performance indicator of a cache;
   determining a set of one or more cache performance parameters based on the cache performance indicator;
   comparing the set of one or more cache performance parameters to a set of one or more energy-efficient targets for those cache performance parameters;
   dynamically resizing the cache to an optimal cache based on the comparison of the cache performance parameters to the energy-efficient targets to reduce power consumption;
   entering a deep-sleep state by shrinking the cache; and
   waking up from the deep-sleep state by expanding the cache to a size that was determined to be the optimal cache size prior to entering the deep-sleep state.

9. The non-transitory, machine readable storage medium of claim 8, wherein the cache performance indicator of the cache is a cache miss counter, and the set of one or more cache performance parameters includes at least one of a cache miss per cycle measurement, a target cache miss per cycle deviation, and a cache miss per cycle variation.

10. The non-transitory, machine readable storage medium of claim 9, wherein the set of one or more energy-efficient targets includes a target cache miss per cycle; and
   dynamically resizing the cache includes resizing the cache to tune the cache miss per cycle measurement towards the target cache miss per cycle.

11. The non-transitory, machine readable storage medium of claim 9, wherein the set of one or more energy-efficient targets includes a convergence threshold; and dynamically resizing the cache includes resizing the cache until the target cache miss per cycle deviation is less than the convergence threshold.

12. The non-transitory, machine readable storage medium of claim 9, wherein the set of one or more energy-efficient targets includes a stability threshold; and dynamically resizing the cache includes reverting the cache to full size when a workload phase change is detected, wherein the workload phase change is detected when the cache miss per cycle variation is above the stability threshold.

13. The non-transitory, machine readable storage medium of claim 8, wherein the cache is expanded by enabling one or more cache ways of the cache, and the cache is shrunk by disabling one or more cache ways of the cache.

14. The non-transitory, machine readable storage medium of claim 8, wherein the cache is a last level cache (LLC).

15. An apparatus for efficient energy consumption comprising:

a cache including a plurality of cache partitions;

at least one central processing unit (CPU) core coupled to the cache; and a power control unit (PCU) adapted to determine an optimal cache size of the cache based on monitoring a cache performance indicator of the cache, and to reduce power consumption by selectively powering one or more cache partitions to dynamically resize the cache to achieve the optimal cache size, wherein the PCU is to enable a deep-sleep state by shrinking the cache, and to wake up from the deep-sleep state by expanding the cache to a size that was determined to be the optimal cache size prior to entering the deep-sleep state.

16. The apparatus of claim 15, wherein the cache performance indicator of the cache is a cache miss counter.

17. The apparatus of claim 15, wherein the cache is a last level cache (LLC), and each of the cache partitions is a cache way of the cache.

18. A non-transitory, machine readable storage medium containing instructions that when processed by a machine to cause the machine to fabricate logic comprising:

a power control unit (PCU) adapted to determine an optimal cache size of a cache based on monitoring a cache performance indicator of the cache, and to reduce power consumption by selectively powering one or more cache partitions to dynamically resize the cache to achieve the optimal cache size, wherein the PCU is to enable a deep-sleep state by shrinking the cache, and to wake up from the deep-sleep state by expanding the cache to a size that was determined to be the optimal cache size prior to entering the deep-sleep state.

* * * * *